United States Patent
Hofmann (10) Patent No.: US 12,508,957 B2
(45) Date of Patent: Dec. 30, 2025

(54) LOCKING DEVICE FOR A VEHICLE SEAT, COMPRISING A SECURING SECTION THAT SECURES A LOCKING ELEMENT IN A LOCKING POSITION IN A POSITIVE MANNER

(71) Applicant: Brose Fahrzeugteile SE & Co. Kommanditgesellschaft, Coburg, Coburg (DE)

(72) Inventor: Jochen Hofmann, Marktgraitz (DE)

(73) Assignee: Brose Fahrzeugteile SE & Co. Kommanditgesellschaft, Coburg (DE)

( * ) Notice: Subject to any disclaimer, the term of this patent is extended or adjusted under 35 U.S.C. 154(b) by 296 days.

(21) Appl. No.: 18/012,255

(22) PCT Filed: Jun. 21, 2021

(86) PCT No.: PCT/EP2021/066818
§ 371 (c)(1),
(2) Date: Sep. 13, 2023

(87) PCT Pub. No.: WO2021/259854
PCT Pub. Date: Dec. 30, 2021

(65) Prior Publication Data
US 2024/0416803 A1  Dec. 19, 2024

(30) Foreign Application Priority Data
Jun. 25, 2020  (DE) .................... 10 2020 207 924.2

(51) Int. Cl.
*B60N 2/08* (2006.01)
*B60N 2/07* (2006.01)

(52) U.S. Cl.
CPC ......... *B60N 2/0806* (2013.01); *B60N 2/0707* (2013.01); *B60N 2/0825* (2013.01); *B60N 2/0868* (2013.01)

(58) Field of Classification Search
CPC .. B60N 2/0806; B60N 2/0707; B60N 2/0825; B60N 2/0868
USPC ........................................................ 248/429
See application file for complete search history.

(56) References Cited

U.S. PATENT DOCUMENTS

| | | | |
|---|---|---|---|
| 6,113,051 A * | 9/2000 | Moradell | B60N 2/0715 |
| | | | 296/68.1 |
| 7,722,006 B2 * | 5/2010 | Beneker | B60N 2/0893 |
| | | | 248/424 |
| 9,855,868 B2 * | 1/2018 | Harvey | B60N 2/085 |
| 10,486,557 B2 * | 11/2019 | Sportelli | B60N 2/0818 |
| 2003/0047977 A1 | 3/2003 | Lejeune et al. | |

(Continued)

FOREIGN PATENT DOCUMENTS

| | | |
|---|---|---|
| DE | 3631791 A1 | 4/1987 |
| DE | 19617691 C1 | 5/1997 |

(Continued)

*Primary Examiner* — Muhammad Ijaz
(74) *Attorney, Agent, or Firm* — Dickinson Wright PLLC (57) ABSTRACT

A locking device for a vehicle seat. The locking device including at least one securing section provided on an unlocking element of the locking device, which in a locking position of a locking element of the locking device positively engages in a form-fit area of the locking element and blocks a displacement of the locking element into its unlocking position.

20 Claims, 9 Drawing Sheets

(56) References Cited

U.S. PATENT DOCUMENTS

| | | | | |
|---|---|---|---|---|
| 2010/0327139 A1* | 12/2010 | Wojatzki | B60N 2/0715 | 248/429 |
| 2011/0012004 A1* | 1/2011 | Wieclawski | B60N 2/0705 | 248/429 |
| 2012/0132777 A1* | 5/2012 | Nakamura | B60N 2/0818 | 248/429 |
| 2012/0294674 A1* | 11/2012 | Lee | B60N 2/0818 | 403/322.4 |
| 2013/0214112 A1* | 8/2013 | Kawamura | B60N 2/42709 | 248/429 |
| 2014/0263920 A1* | 9/2014 | Anticuar | B60N 2/0715 | 248/429 |
| 2015/0258915 A1* | 9/2015 | Kim | B60N 2/0705 | 248/429 |
| 2016/0039314 A1* | 2/2016 | Anticuar | B60N 2/0715 | 248/429 |
| 2016/0193942 A1* | 7/2016 | Kim | B60N 2/0875 | 29/428 |
| 2017/0036567 A1* | 2/2017 | Sato | B60N 2/0705 | |
| 2017/0036568 A1* | 2/2017 | Kumagai | B60N 2/0806 | |
| 2018/0079325 A1* | 3/2018 | Hayashi | B60N 2/0843 | |
| 2018/0229625 A1* | 8/2018 | Gorcic | B60N 2/0727 | |
| 2023/0256872 A1* | 8/2023 | Kuroda | B60N 2/0705 | 248/429 |
| 2024/0383378 A1* | 11/2024 | Lee | B60N 2/0818 | |
| 2024/0416803 A1* | 12/2024 | Hofmann | B60N 2/0707 | |

FOREIGN PATENT DOCUMENTS

| | | |
|---|---|---|
| DE | 102008003650 A1 | 8/2008 |
| EP | 0947380 A1 | 10/1999 |
| EP | 2298590 B1 | 11/2015 |
| KR | 20190078369 A | 7/2019 |
| WO | 2005021319 A2 | 3/2005 |
| WO | 2009015809 A2 | 2/2009 |
| WO | 2013029150 A1 | 3/2013 |

* cited by examiner

LOCKING DEVICE FOR A VEHICLE SEAT, COMPRISING A SECURING SECTION THAT SECURES A LOCKING ELEMENT IN A LOCKING POSITION IN A POSITIVE MANNER

CROSS-REFERENCE TO RELATED APPLICATIONS

This application is the U.S. National Phase of PCT/EP2021/066818 Filed Jun. 21, 2021 which claims priority to German Application No.: DE 10 2020 207 924.2 filed Jun. 25, 2020, the entire disclosures of which are incorporated by reference herein.

TECHNICAL FIELD

The present disclosure relates to a locking device for a vehicle seat.

BACKGROUND

Locking devices for the arrestment of seat components or for the arrestment of a vehicle seat in a longitudinal seat position are widely known. In such locking devices, there is provided at least one locking element adjustable into a locking position along a locking direction, for example in the form of a locking pin.

As an example, when a plurality of separate adjustable locking elements are provided on a locking device, undesired displacement movements of the locking elements can occur in practice under dynamic loads occurring in operation. The displacement movements in turn can be disadvantageous in the event of a crash and possibly negatively influence a desired alignment of the locking elements with respect to the at least one detent opening. Moreover, locking devices in practice frequently are characterized by an insufficient operating comfort and such as unpleasant haptics, as for an alleged secure locking a comparatively long stroke is provided in order to compensate existing tolerances. Moreover, it can regularly be observed that an operating force to be applied on the part of a user manually or by an electric motor in order to release a locking is disadvantageous in terms of height and course, when a plurality of locking elements that partly are not in engagement must be unlocked (as well). Therefore, comparatively complex mechanisms typically are provided in order to on the one hand realize an unlocking and on the other hand effectively secure at least one locking element of the locking device in its locking position.

SUMMARY

Against this background it is the object underlying the proposed solution to provide an improved locking device.

According to a first aspect, there is provided a locking device for a vehicle seat, in which at least one securing section is provided on an unlocking element of the locking device, which in a locking position of the locking element positively engages in a form-fit area of the locking element and blocks a displacement of the locking element into an unlocking position.

In this respect, the proposed solution proceeds from the basic idea to integrate an additional securing function on an unlocking element provided for unlocking, via which a locking element located in its locking position is secured against a displacement into its unlocking position via at least one form fit.

Via the securing section positively engaging in the form-fit area of the locking element, a displaceability of the locking element in a direction opposite to the locking direction in principle can be limited. This may include the fact that in the case of the securing section of the unlocking element positively engaging in the form-fit area, the at least one locking element cannot or at best slightly be displaced out of its locking position. In an alternative design variant, the securing section can, however, also engage with a clearance in the form-fit area of the locking element located in the locking position. This allows to facilitate an adjustment of the unlocking element in order to bring the securing section in engagement with the form-fit area and, when the locking device is unlocked, again displace the same out of the form-fit area. As an example, the risk of jamming is reduced via the engagement of the securing section in the form-fit area with a clearance.

The form-fit area may be formed e.g. by a form-fit opening, a form-fit web or a form-fit cutout on the locking element.

When the securing section engages in the form-fit area with a clearance, the displaceability of the locking element by a defined amount can be permitted, but can be limited in so far that the locking is not released via a maximally permitted displacement of the locking element. What can be specified, for example, as a defined amount is a distance of two abutment surfaces facing each other in a form-fit opening, between which the securing section can be displaced. In the case of a load dynamically acting on the locking device, the locking element thus can be displaced relative to the securing section and/or the securing section can be displaced relative to the locking element. However, via the engagement of the securing section in the form-fit opening, the displaceability of the locking element remains limited so that the locking never is released completely by such a displacement. Hence, it remains ensured that the locking element cannot be brought out of engagement completely or at least not out of engagement with all of a plurality of detent holes in which the locking element engages in its locking position, e.g. in order to arrest the vehicle seat in a longitudinal seat position taken. An individual locking element also can reach through a plurality of detent holes via its insertion section in order to provide a (more) loadable locking.

In one design variant, when the locking element is located in its locking position (and hence when the locking device is locked), the securing section can be displaced out of the form-fit area and the locking element can be adjusted into its locking position via an adjustment of the unlocking element along its opening direction. With an adjustment of the unlocking element along its opening direction, the securing section consequently is displaced out of the form-fit area and subsequently, i.e. with a further adjustment of the unlocking element along the opening direction, the locking element is adjusted into its unlocking position. The unlocking element hence is configured and arranged to displace the securing section out of the form-fit area during an adjustment in its opening direction, and subsequently, with a further adjustment of the unlocking element along the opening direction, adjust the locking element into its unlocking position. Via an adjusting movement of the unlocking element, the additional securement via the securing section thus can be released and the locking element can also be adjusted into its unlocking position.

Alternatively or additionally, the unlocking element in one design variant includes an active surface inclined with respect to the opening direction of the unlocking element, via which, by contact of the active surface with the locking element and during an adjustment of the unlocking element in the opening direction, the locking element can be adjusted in a direction opposite to the locking direction. Thus, the active surface for example rests against the locking element (e.g. against an adjustment section of the locking element) and adjusts the locking element in a direction opposite to the locking direction, when the unlocking element is adjusted along its opening direction. An adjustment section of the locking element, on which the unlocking element acts via the active surface, therefor can form for example a control edge and/or a likewise inclined counter-surface along which the active surface is shifted when the unlocking element is adjusted in the opening direction. In principle, via an inclined active surface of the unlocking element, a more compact construction of the locking device can be realized, as it thereby becomes possible that the adjustment direction of the unlocking element is different from the adjustment direction of the locking element.

In one design variant, the locking element is elastically pretensioned into its locking position via at least one spring element so that the locking device is locked automatically when the locking element faces a detent opening and is not impeded from outside to engage in these detent openings. In one design variant, the at least one spring element at the same time can also pretension the unlocking element via a contact of the locking element with the unlocking element (for example on the above-mentioned inclined active surface), namely in a closing direction extending oppositely to its opening direction. Thus, via the at least one spring element, the locking element on the one hand is elastically pretensioned into its locking position and on the other hand the unlocking element is elastically pretensioned in its closing direction. In this way, the unlocking element is pretensioned into a securing position by action of the spring element, in which securing position the securing section engages in the form-fit area of the locking element. Via an inclined active surface of the unlocking element, for example, on the one hand a force transmission of the restoring force applied by the spring element to the unlocking element can be effected via an adjustment section of the locking element in order to adjust the unlocking element in the closing direction, and on the other hand a force transmission of an adjusting force applied onto the unlocking element from outside to the locking element can be effected in order to adjust the locking element into its unlocking position.

In one exemplary embodiment, the unlocking element can be pressed in the opening direction. Consequently, a compressive force can be applied onto the unlocking element in order to release a locking via the locking device. In other words, the unlocking element then for example is configured to be pressed in the opening direction manually or controlled by a motor in order to release a locking via the at least one locking element. Thus, by pressing the unlocking element an arrestment can be released in a targeted way, for example against the action of a restoring force applied by at least one spring element. The fact that the unlocking element can be adjusted by applying a compressive force in the opening direction that may improve the operating comfort for a user. Furthermore, a less complex unlocking mechanism possibly can be realized thereby as compared to an unlocking element that must be pulled in the opening direction in order to release a locking.

In one exemplary embodiment, the locking direction (and the unlocking direction opposite thereto) of the locking element extends perpendicularly to the opening direction of the unlocking element. For example, this can be realized via an active surface extending at an angle to the opening direction of the unlocking element, via which active surface an adjusting force can be transmitted from the unlocking element to the locking element.

In one design variant, the locking device comprises at least two, e.g., exactly two locking elements, which in a locking position each jointly engage in at least one detent opening or each engage in at least one detent opening. Via at least two or also exactly two locking elements a double mechanical arrestment, e.g. of a longitudinal seat position, can thus be realized. When each locking element engages in a detent opening, this includes the fact that a plurality of detent openings is provided for defining different adjustment positions, such as longitudinal seat positions, and via the engagement in two detent openings located one behind the other along a longitudinal seat position an adjustment position is defined.

To achieve in this connection that the arrestment, e.g. of a vehicle seat in different longitudinal seat positions, becomes more flexible and at the same time more loadable by using a locking device, the at least two locking elements in one design variant are spaced apart from each other in such a way, and a plurality of detent openings arranged one behind the other (e.g. with respect to a future longitudinal seat axis) are dimensioned and spaced apart from each other for defining different adjustment positions in such a way that the at least two locking elements can both jointly engage in an individual detent opening and individually in two adjacent detent openings separated from each other by a latching web, so that the latching web then is located between the at least two locking elements engaging in the adjacent detent openings. In this way, an adjustment position can be defined and hence be covered by each locking element, wherein then a (clearance-free) additional locking is provided via the at least one or exactly one further locking element. Via the corresponding spacing of the locking elements among each other and of the detent openings from each other, the further locking element here always can engage either in the same detent opening or in an adjacent detent opening.

In a development based thereon, the at least one securing section of the unlocking element can positively engage in form-fit areas on the at least two locking elements and hence block a displacement of the at least two locking elements into their unlocking positions when the at least two locking elements are located in their locking positions. The at least one securing section of the one unlocking element thus engages both in a (first) form-fit area of a (first) locking element and in a further (second) form-fit area of the other (second) locking element in order to block both locking elements located in their respective locking positions against a displacement into their respective unlocking position.

Since a securing section is provided for at least two or exactly two locking elements, the mechanism for locking and unlocking can be designed comparatively simple and hence not very complex with a comparatively high mechanical loadability of the locking. Moreover, the locking device can be of very compact design without having to compromise in terms of failure safety. For example, the at least one securing section also can be displaceable out of the at least two form-fit areas of the locking elements via an adjustment of the unlocking element in the opening direction, wherein then the (two) locking elements can be adjusted into their unlocking positions, synchronously in one exemplary embodiment, with the further adjustment of the unlocking element. Thus, via the adjustment of the unlocking element along its opening direction the securing section on the one hand is displaced out of the form-fit areas of the locking elements, and subsequently the at least two locking elements are, possibly synchronously, adjusted into their unlocking positions.

The above-mentioned aspect of a dual securement of two locking elements via one form fit each by means of an individual securing section, which contributes to a compact construction of a locking device with an efficient mechanical securement at the same time, in principle is independent of the integration of a securing section in an unlocking element that forms part of an unlocking mechanism for releasing the locking provided via the locking device. Correspondingly, a further independent aspect of the proposed solution provides a locking device for a vehicle seat, which comprises at least two, e.g., exactly two locking elements adjustable each along a locking direction into a locking position, which each include an insertion section that in the respective locking position engages in at least one detent opening. The at least two locking elements can be adjusted each in a direction opposite to their respective locking direction, i.e. along an unlocking direction, into an unlocking position in which the respective locking element is out of engagement with the at least one detent opening, and hence the vehicle seat can be adjusted in terms of its seat position via the locking device. Now, it furthermore is provided that at least one securing section positively engages in one form-fit area each on the locking elements and blocks a displacement of the locking elements into their unlocking positions, when the at least two locking elements are located in their locking positions.

As explained above, this aspect of the proposed solution thus proceeds from a mechanical securement of at least or exactly two locking elements in their locking positions, namely via the engagement of an individual securing section in one form-fit area each on the locking elements. Such a securing section can be integrated via any kind of additional element, such as via an unlocking element. The securing section may be adjustable via a mass-controlled locking or by means of a pre-crash actuator and/or can be used in linearly or rotationally adjustable locking elements. Alternatively or in addition, a combination with the design variants of the above-mentioned solution aspect can be provided.

For example, a proposed locking device can be used to form a locking assembly which beside a locking device comprises first and second rail elements for setting a longitudinal seat position of a vehicle seat. A first rail element for example is stationary and can be fixed to a floor of the vehicle when the vehicle seat is mounted in a vehicle. The other rail element is shiftable on the first rail element and connected to the vehicle seat so that the vehicle seat can be adjusted in its longitudinal seat position along the first rail element by means of the second rail element. For the arrestment of a longitudinal seat position, the first and second rail elements then can be locked with each other via the at least one locking device. The at least one adjustable locking element (or the at least or exactly two locking elements) of the locking device can be mounted on the first rail element or on the second rail element.

In one design variant, the locking element can be adjusted between its locking position and its unlocking position along an adjustment axis extending perpendicularly to a direction of longitudinal extension of the first and/or second rail element. In the locking position, the locking element engages in at least one detent opening on the first or second rail element, which is provided on a section of the first or second rail element extending (for example) transversely to the direction of longitudinal extension and transversely to the adjustment axis. With respect to a mounting situation of a vehicle seat in a vehicle comprising the locking assembly, such a section for example projects upwardly and the at least one locking element in its locking position laterally engages in a detent opening of such a section. Referring to the above-mentioned design variants, it is of course also possible to provide at least two or exactly two locking elements adjustable for example along parallel adjustment axes.

In principle, the proposed locking device can be provided for example for an arrestment of a vehicle seat in a longitudinal seat position or an arrestment of a seat component of a vehicle seat, such as e.g. a seat underpart, a pan part or a backrest part. Via the engagement of the at least one locking element in at least one detent opening it thus is possible for example to arrest the vehicle seat in a longitudinal seat position on a vehicle floor or to arrest a rotatably or shiftably mounted seat underpart, e.g. of a swivel seat, or to arrest a pan inclination, backrest inclination or backrest head inclination.

In connection with the proposed solution, there is furthermore also provided a vehicle seat with a design variant of a proposed locking device according to the first and/or second aspect or with a corresponding locking assembly.

BRIEF DESCRIPTION OF THE DRAWINGS

The attached Figures by way of example illustrate possible design variants of the proposed solution.

In the drawings.

DETAILED DESCRIPTION OF EMBODIMENTS

Figure 1:
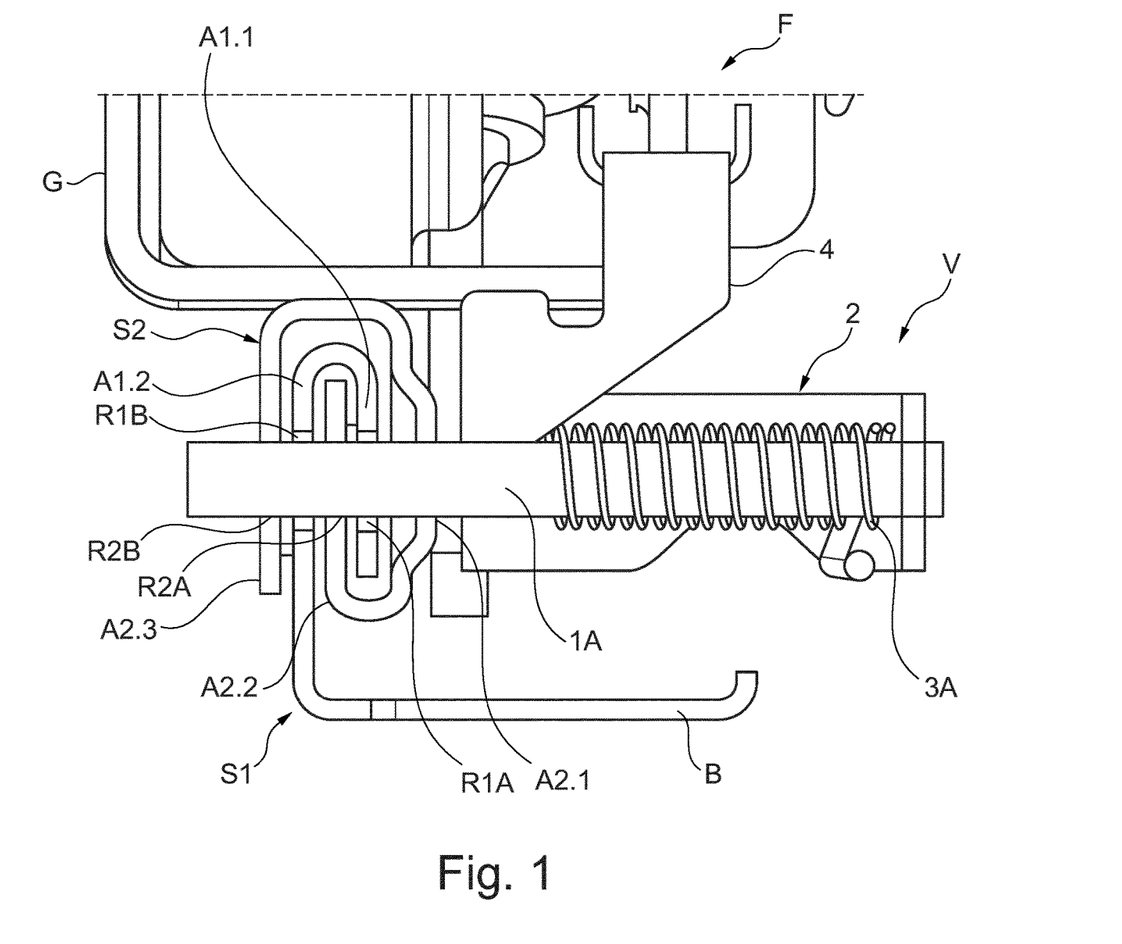
FIG. 1 sectionally shows a vehicle seat with a design variant of a proposed locking device for the arrestment of a longitudinal seat position of the vehicle seat.

FIG. 1 sectionally shows a vehicle seat F which is fixed to a rail arrangement by a seat base G and can longitudinally shiftably be fixed on a vehicle floor via the rail arrangement. The rail arrangement on each long side includes two rail elements in the form of seat rails S1 and S2 which are associated to one of the long sides of the vehicle seat F. Correspondingly, an analogously configured further rail pair is provided on an opposite long side of the vehicle seat F.

A known locking device is provided, for example, in EP 0 947 380 A1, which includes a locking element. The locking element includes an insertion section which in the locking position engages in at least one detent opening in order to arrest e.g. the vehicle seat in a longitudinal seat position. For example, to define different longitudinal seat positions a plurality of detent openings arranged one behind the other are provided on a rail element for the longitudinal seat adjustment. To again bring the locking element out of engagement with the at least one detent opening, an unlocking element is part of the locking device, which during an adjustment in an opening direction adjusts the locking element in a direction opposite to its locking direction, i.e. along an unlocking direction, into an unlocking position.

A first seat rail S1 of the rail pair shown in FIG. 1 is provided for fixation on the vehicle floor and therefor includes at least one fastening section B. On the first seat rail S1 a second seat rail S2 is shiftably held, to which the vehicle seat F is fixed via the seat base G. In the present case, both seat rails S1 and S2 include bent rail sections A1.1, A1.2 or A2.1, A2.2, A2.3, via which the seat rails S1 and S2 engage in each other and on which detent openings R1A, R1B or R2A, R2B are formed. The first, floor-mounted seat rail S1 includes two rail sections A1.1 and A1.2, which face each other and between which a rail section A2.2 of the second, shiftable seat rail S2 is received. This (middle) rail section A2.2 of the second seat rail S2, which is received between the two rail sections A1.1 and A1.2 of the first seat rail S1, is located on the second seat rail S2 centrally between two edge-side rail sections A2.1 and A2.3 and hence each faces these two edge-side rail sections A2.1 and A2.3 (with different end faces). In the properly mounted state of the rail arrangement, the second seat rail S2 overlaps the two rail sections A1.1 and A1.2 of the first seat rail S1 with the edge-side rail sections A2.1 and A2.3 when the second seat rail S2 has been properly pushed onto the first seat rail S1 along an axis of longitudinal extension of the first seat rail S1.

On one of the outer, edge-side rail sections A2.1, A2.3— the rail section A2.1 shown on the right in the Figure-a locking device V is mounted. The locking device V hence is fixed to the second, shiftably mounted seat rail S2.

For fixation on the second seat rail S2, the locking device V has a housing 2. This housing 2 can be fixed to the edge-side rail section A2.1, for example via at least one weld, screw, bolt and/or rivet connection.

The locking device includes two locking elements in the form of locking pins 1A, 1B, which (see for example FIG. 3) are shiftably mounted on the housing 2 along adjustment axes extending parallel to each other. Each locking pin 1A, 1B here is elastically pretensioned into an extended position and hence into a locking position via an associated spring element in the form of a compression spring 3A or 3B.

Figure 3:
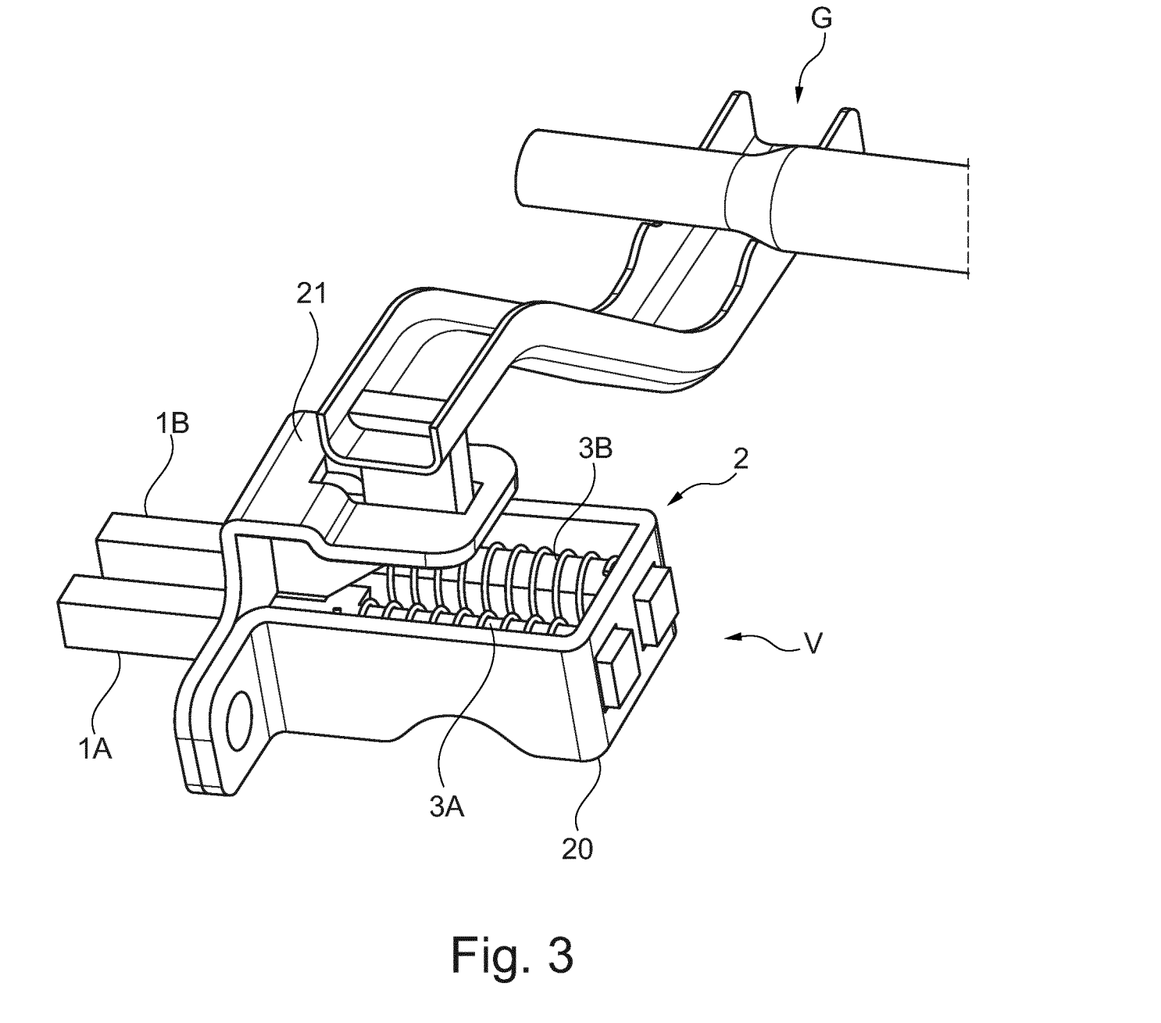
FIG. 3 in a perspective view shows the locking device with its connection to a seat base of the vehicle seat.

In a locking position shown in FIG. 1 or FIG. 3, a locking pin 1A, 1B engages in detent openings R1A, R1B, R2A, R2B of the seat rails S1 and S2, which are made to coincide with each other in pairs and possibly are aligned with each other, in order to lock the seat rails S1 and S2 with each other and in this way arrest a longitudinal seat position of the vehicle seat F. Each locking pin 1A, 1B with an insertion section 10A, 10B (see for example FIG. 4C) extends both through two pairs of detent openings R2A, R2B, which are formed to face each other on the rail sections A2.2 and A2.3 of the second seat rail, and through two coinciding pairs of detent openings R1A and R1B facing each other, which are formed on the rail sections 1.1 and 1.2 of the first, floor-mounted seat rail S1.

Figure 2A:
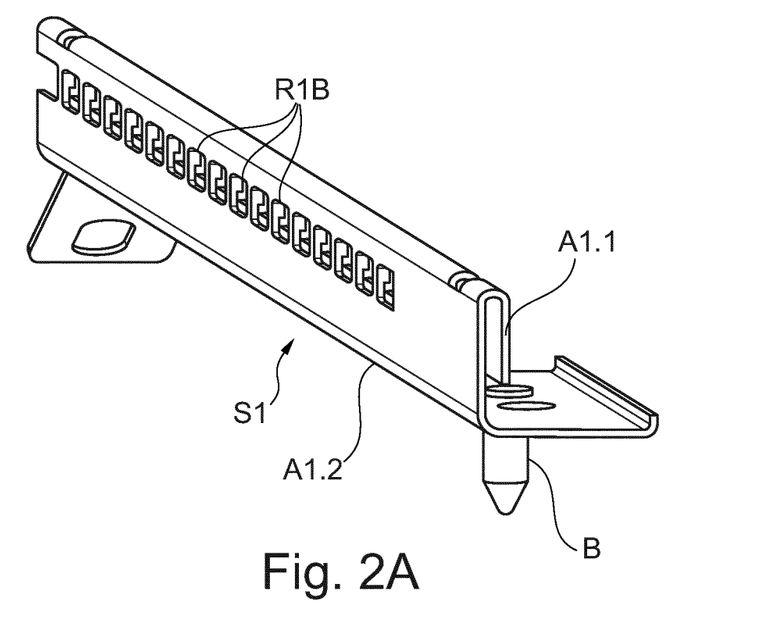
FIG. 2A in an individual representation shows a first rail element to be fixed on a vehicle floor for the vehicle seat of FIG. 1.

As is illustrated with reference to the individual view of the first seat rail S1 of FIG. 2A, each rail section A1.1 and A1.2 of the first seat rail S1 includes a plurality of detent openings R1A, R1B which succeed each other along a longitudinal extension of the first seat rail S1 in order to define different longitudinal seat positions for the vehicle seat F.

Figure 2B:
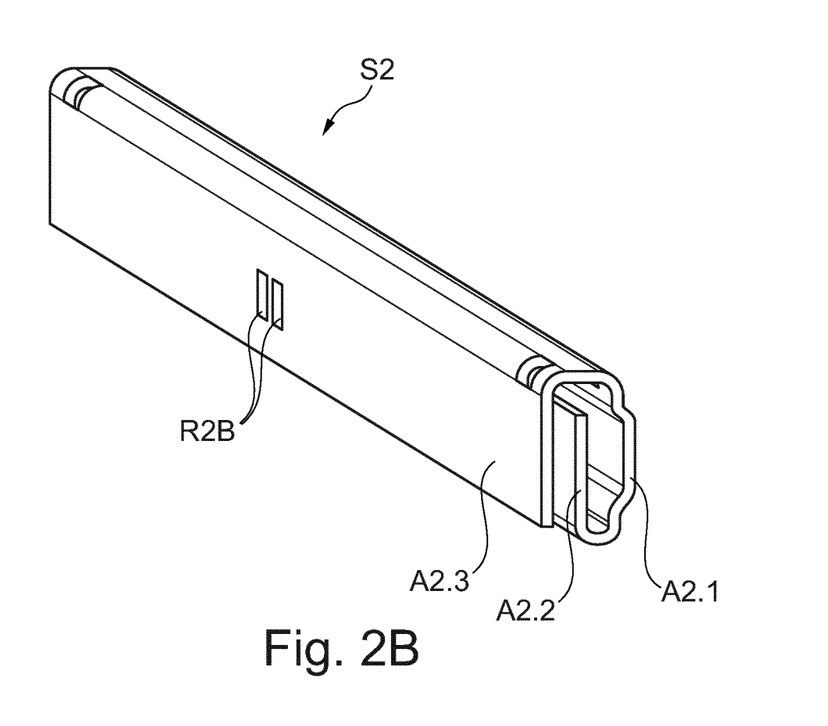
FIG. 2B in an individual representation shows a second rail element, which in the mounted state is shiftably held on the first rail element of FIG. 2A.

On the second, longitudinally shiftable seat rail S2, on the other hand, merely exactly one pair of detent openings R2A, R2B is formed for the locking pins 1A, 1B on each rail section A2.1, A2.2 and A2.3 corresponding to FIG. 2B, through which detent openings the locking pins 1A, 1B of the rail-mounted locking device V can engage in detent openings R1A, R1B of the first seat rail S1, which are possible depending on the longitudinal seat position.

For the locking elements 1A and 1B adjustable transversely to a longitudinal extension of the seat rails S1 and S2, the housing 2 of the locking device V includes a bearing part 20. In the present case, the bearing part 20 for example is formed by a U-shaped sheet-metal part at the base of which two through openings are provided for the passage of ends of the locking pins 1A, 1B. Via the compression springs 3A and 3B, which on the one hand are supported on the inside of this base of the bearing part 20 and on the locking pins 1A and 1B, the locking pins 1A and 1B are pretensioned into their locking position in the direction of a section of a guide part 21 of the housing 2 facing the base.

The guide part 21 has one common through opening or two individual through openings for the insertion sections 10A, 10B of the locking pins 1A and 1B. Furthermore, the guide part 21 of the housing 2 forms a guiding slot 210 (see for example FIG. 4A) for an unlocking element 4 of the locking device V. Via this guiding slot 210, the unlocking element 4 is shiftably guided on the housing 2 perpendicularly to the adjustment axes of the locking pins 1A and 1B. Via the guide part 21 with its guiding slot 210, a linear guidance hence is provided for the unlocking element 4. The unlocking element 4, as will yet be explained below in more detail, can act on the locking pins 1A and 1B in order to adjust the same along an unlocking direction (in the present case in the direction of the base of the bearing part 20) and hence bring the same out of engagement with the rail-side detent openings R1A, R1B, R2A and R2B, whereby a longitudinal seat adjustment of the vehicle seat F along the floor-mounted, first seat rail S1 is permitted.

Figure 4A:
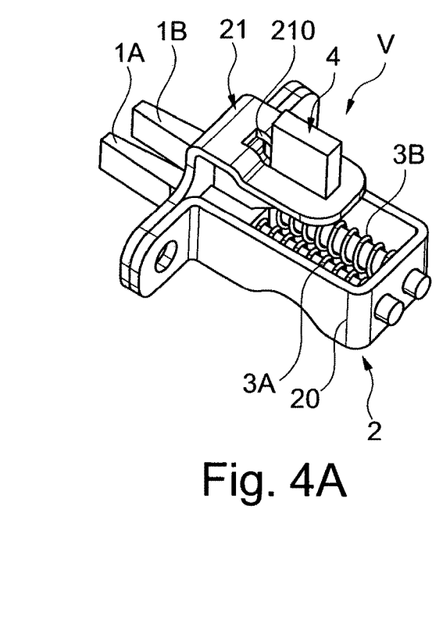
FIGS. 4A-4C in different views show the locking device including exactly two pin-shaped locking elements in a locked state in which both locking elements take a locking position.
Figure 4B:
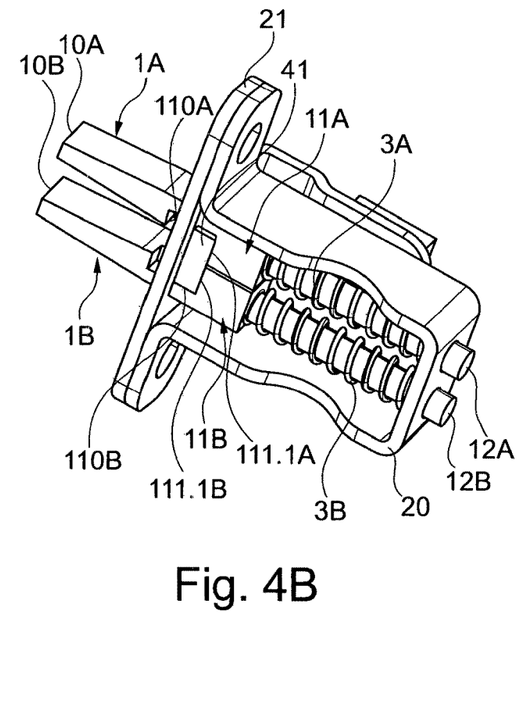
Figure 4C:
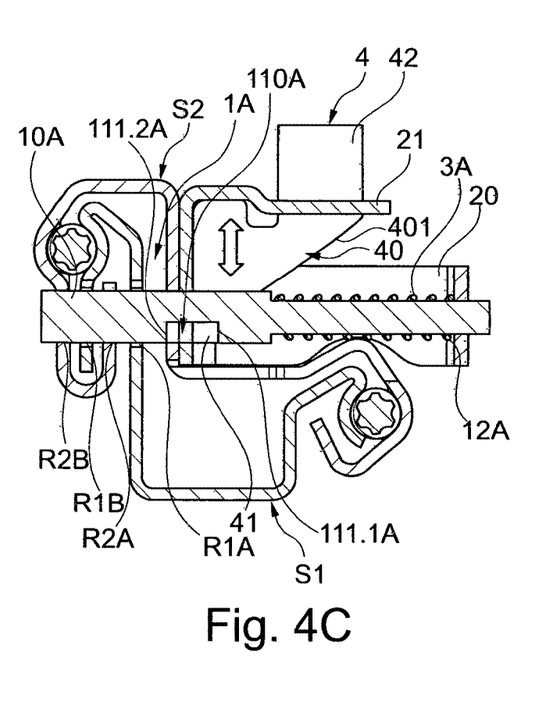

In a completely locked state of the locking device V, corresponding to FIGS. 4A, 4B and 4C, the locking pins 1A and 1B with their insertion sections 10A and 10B maximally project from the housing 2 of the locking device V and each engage in all overlapping, here four detent openings R1A, R1B, R2A and R2B of the two seat rails S1 and S2 in order to arrest the vehicle seat F in a longitudinal seat position. The unlocking element 4 here is adjusted into a securing position by action of the compression springs 3A and 3B. The two compression springs 3A and 3B each pretension the associated locking pin 1A and 1B into the locking positions shown in FIGS. 4A to 4C. At the same time, the locking pins 1A and 1B press against a ramp-shaped active surface 401 of an adjusting body 40 of the unlocking element 4 via a respective adjusting section 11A or 11B and thus pretension the locking element 4 into the securing position (in the present case upwards with respect to the mounting situation of the locking device V as shown in FIG. 1). The adjusting section 11A, 11B of a locking pin 1A, 1B is located between an insertion section 10A and 10B and a shank section 12A or 12B of the locking pin 1A, 1B, which carries the respective compression spring 3A, 3B and along which the respective compression spring 3A, 3B extends. On an end face of the adjusting section 11A or 11B broadened with respect to the shank section 12A or 12B, the compression spring 3A or 3B is supported on the locking pin 1A or 1B in order to pretension the same in the direction of its respective locking position.

In addition to the adjusting body 40 on which the active surface 401 is provided for contact with the locking pins 1A and 1B, the unlocking element 4 also includes an actuating section 42 and a securing section 41. With the actuating section 42, the unlocking element 4 extends through the guiding slot 210 on the guide part 21 so that the actuating section 41 can be actuated from outside of the housing 2 of the locking device 4 in order to control unlocking of the locking device V manually or by an electric motor. In the present case, the securing section 41 of the unlocking element 4 furthermore is provided for a positive engagement in form-fit areas formed by form-fit openings 110A and 110B of the locking pins 1A and 1B, in order to additionally secure the same in their locking position against a displacement into their unlocking positions in which the locking pins 1A and 1B would no longer be in engagement with the detent openings R1A, R1B, R2A and R2B. The adjusting body 40 of the unlocking element 4 with one end centrally extends through the pair of locking pins 1A and 1B so that the securing section 41 provided at this end and the actuating section 42 are located on different sides of the locking pins 1A, 1B.

In the illustrated securing position of the unlocking element 4, the securing section 41 of the unlocking element 4 completely engages in both form-fit openings 110A and 110B, which—in the present case on an underside—are formed at the locking pins 1A and 1B in the region of the respective adjusting section 11A and 11B. Based on a transverse axis extending transversely to the adjustment axes of the locking pins 1A and 1B, the securing section 41 here without any clearance engages in the two form-fit openings 110A, 110B facing each other and unilaterally open of the locking pins 1A and 1B. Hence, via the engagement of the securing section 42 in the form-fit openings 110A, 110B, a defined minimum distance of the locking pins 1A and 1B can be secured.

Figure 5A:
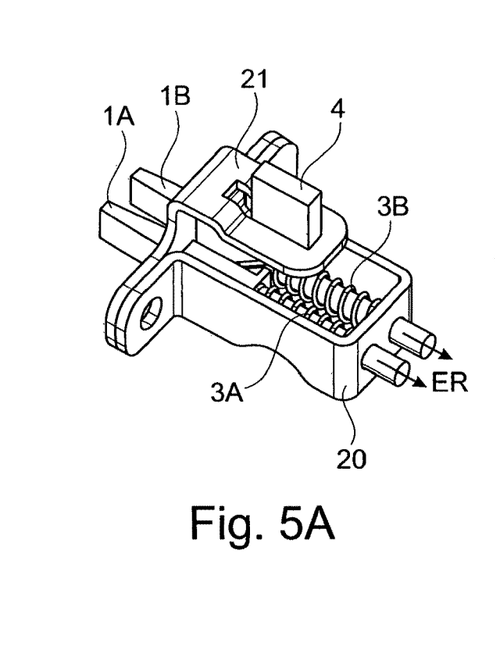
FIGS. 5A-5C in views corresponding with FIGS. 4A to 4C show the locking device under dynamic load, by which locking elements are displaced in a locking direction, but are secured against unlocking by a securing section positively engaging in the locking elements.
Figure 5B:
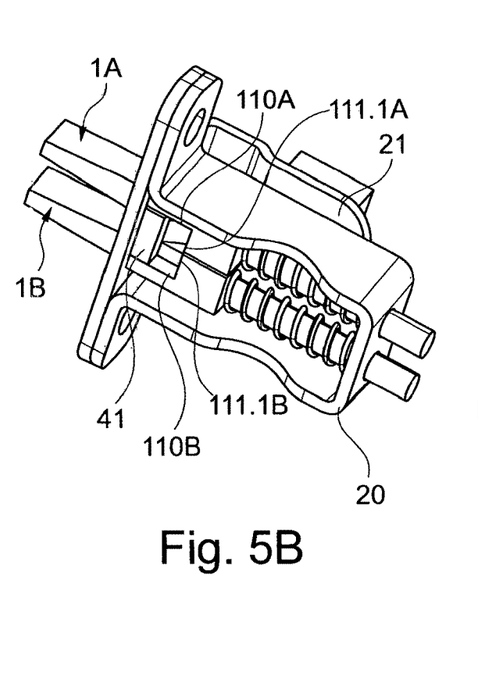
Figure 5C:
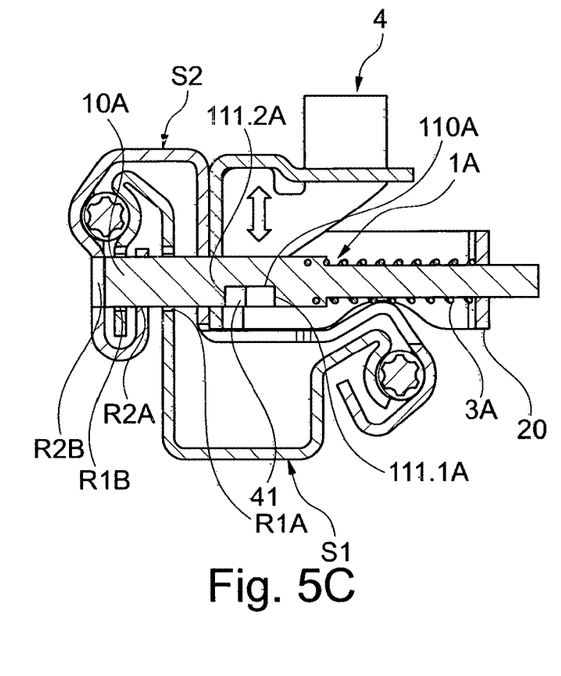
Figure 6A:
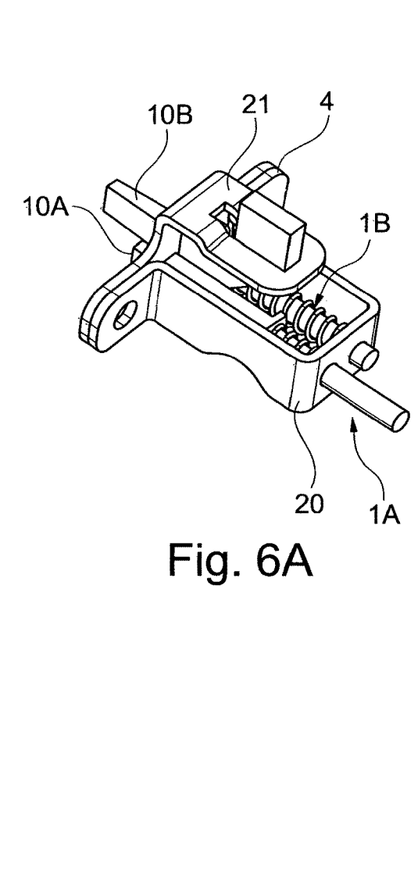
FIGS. 6A-6C in views corresponding with FIGS. 4A to 4C show the locking device during a locking operation and hence an arrestment of a longitudinal seat position taken, in which initially only one of the locking elements is locked and the further locking element will yet snap into place as well.
Figure 6B:
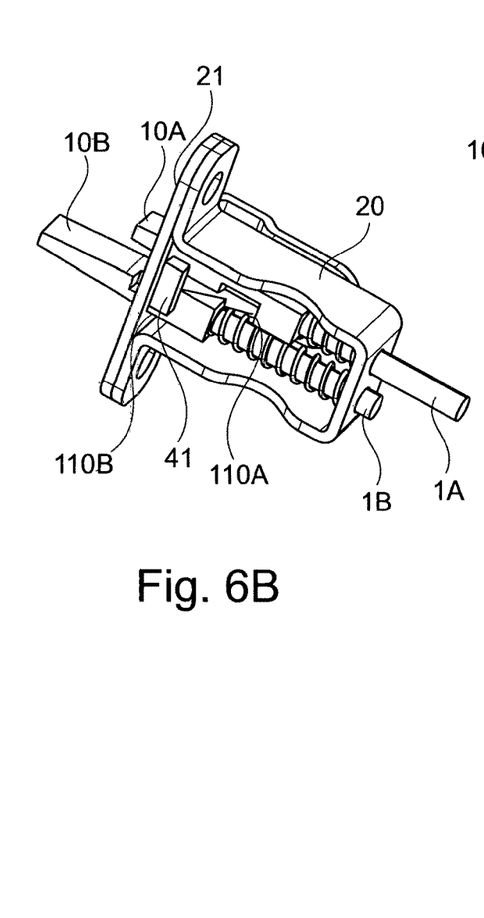
Figure 6C:
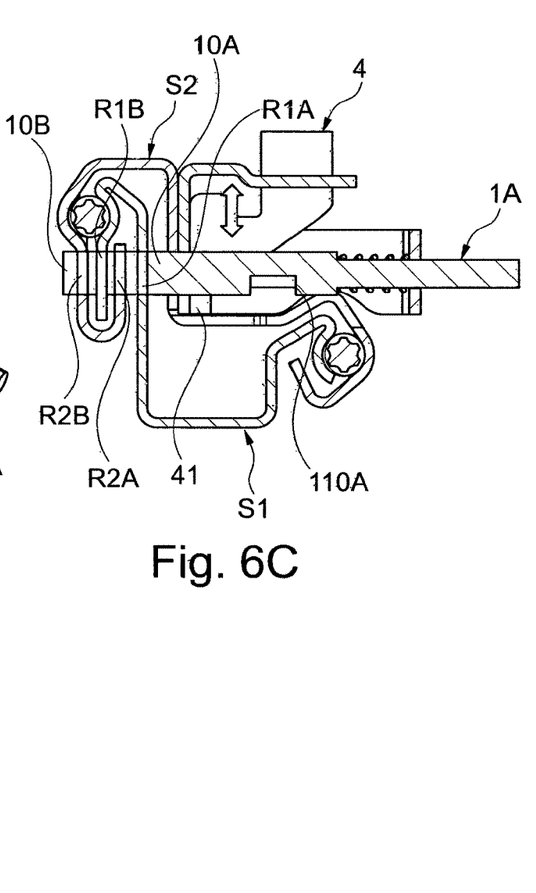

Along the adjustment axes, the securing section 41 engages in the form-fit openings 110A and 110B with a clearance so that a limited displaceability of the locking pins 1A and 1B along their respective longitudinal and adjustment axes from the illustrated respective locking positions in the direction of their unlocking positions is permitted. When the securing section 41 of the unlocking element 4 for example in FIGS. 4A to 4C rests against a first (right) abutment surface 111.1A or 111.1B of the respective form-fit opening 110A or 110B, a locking pin 1A or 1B can be displaced in the direction of its unlocking position each by a defined displacement path specified by the length of the respective form-fit opening 110A, 110B, until a locking pin 1A or 1B abuts against the securing section 41 of the unlocking element 4 via an opposite abutment surface 111.2A or 111.2B of the form-fit opening 110A or 110B. As is illustrated with reference to FIGS. 5A to 5C, the displacement path here is dimensioned in such a way that even with a maximum displacement, for example due to an applied dynamic load on the locking device V, each locking pin 1A or 1B at best can be displaced in the direction of an unlocking position to such an extent that the respective insertion section 10A or 10B cannot be brought out of engagement with both seat rails S1 and S2. In the illustrated design variant, the displaceability permitted via the loose engagement of the securing section 41 in the form-fit openings 110A and 110B at best can be used to realize that a locking pin 1A or 1B is brought out of engagement with the outermost detent opening R2B on the edge-side rail section A2.3 of the second seat rail S2 as a result of a load applied onto the locking device V from outside. However, each locking pin 1A, 1B always remains in engagement with the detent openings R1A and R1B of the first seat rail S1 and the intermediate detent opening R2A of the second seat rail S2 and is also blocked against a further displacement by the securing section 41.

As is illustrated in more detail with reference to FIGS. 6A to 6C and 7A to 7C, the locking device V here designed for a 2-pin locking is adapted and adjusted to the detent openings R1A, R1B of the first seat rail, so that when the vehicle seat F is arrested in a longitudinal seat position, both locking pins 1A and 1B always are in engagement with both seat rails S1 and S2. When the vehicle seat F for example is shifted into a (new) longitudinal seat position with the locking device V initially unlocked, at least one of the locking pins 1A and 1B always instantaneously snaps into first detent openings R1A and R1B of the first seat rail S1 by pretensioning the respective compression spring 3A or 3B when the same face the second detent openings R2A, R2B of the second seat rail and a corresponding adjustment of the locking pins 1A and 1B is not counteracted via the unlocking element 4. When one of the locking pins 1A or 1B has snapped into a detent opening R1A and R1B of the first seat rail S1, a longitudinal displacement of the seat base G and hence of the second seat rail S2 carrying the locking device V can cause snapping into place of the second locking pin 1B or 1A, which so far has not been in engagement (alternatively, the seat rail carrying the plurality of detent openings succeeding each other along the longitudinal axis can be shifted with the seat base G, in case the same is firmly mounted to the seat and the seat rail carrying the locking device V is firmly mounted to the floor).

In the present case, the two locking pins 1A and 1B are spaced apart from each other and the plurality of detent openings R1B arranged one behind the other (and hence also the detent openings R1A facing each other) of the first seat rail S1 are dimensioned and spaced apart from each other in such a way that the two locking pins 1A and 1B can both jointly engage in an individual detent opening R1B and individually in two adjacent detent openings R1B separated from each other by a latching web ST on the first seat rail S1, so that the latching web ST is located between the two locking pins 1A and 1B. The two locking pins 1A and 1B are positioned relative to each other at a pin distance d1 which is greater than or equal to a web width s of a latching web ST between two detent openings R1B. In this way, the two locking pins 1A and 1B can engage in two different detent openings R1B on the first seat rail S1 via their respective insertion section 10A, 10B (cf. FIG. 7A).

Figure 7A:
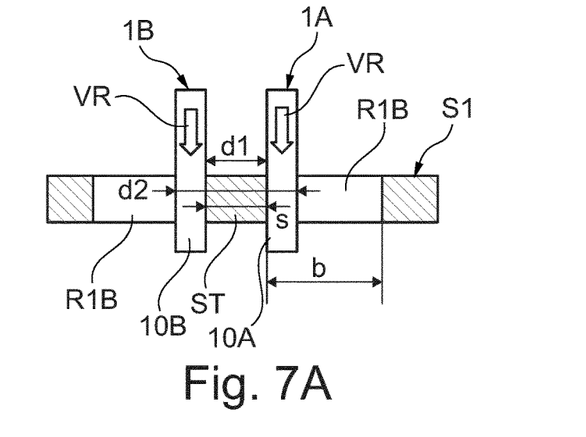
FIGS. 7A-7C schematically and in different views show the engagement of the locking elements of the locking device in detent openings of the first rail element.
Figure 7B:
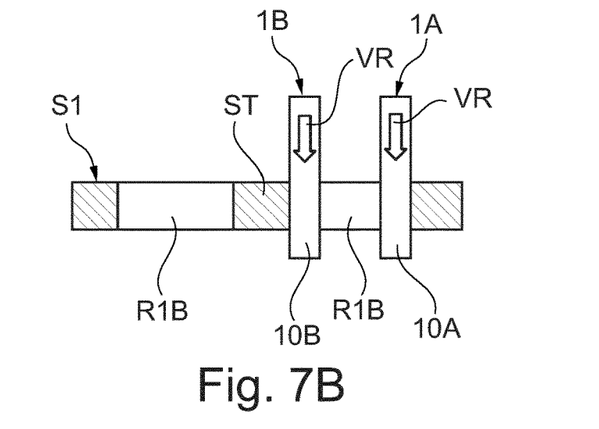
Figure 7C:
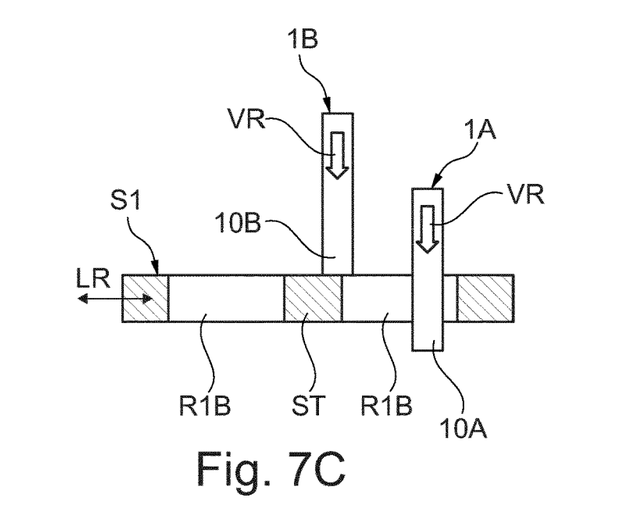

At the same time, the detent openings R1B are formed with an opening width b and the two locking pins 1A and 1B are formed on their insertion sections 10A and 10B with a pin pair width d2 so that both insertion sections 10A and 10B also can jointly engage in an individual detent opening R1B of the first seat rail S1, when the vehicle seat F is positioned correspondingly and hence the two seat rails S1 and S2 take a corresponding position relative to each other (cf. FIG. 7B). Hence it applies that the pin pair width d2, which defines the distance of two shell surfaces facing away from each other on the insertion sections 10A and 10B extending parallel to each other, is less than or equal to the opening width b of the detent openings R1B.

For example, when merely a first locking pin 1A initially engages in a detent opening R1B in a locking direction VR due to its elastic pretension, merely the second, shiftably guided seat rail S2 must be displaced with respect to the floor-mounted first seat rail S1 along a longitudinal direction LR, until then the second locking pin 1B pretensioned in the locking direction VR also can engage either in the adjacent detent opening R1B of the first seat rail S1 or in the same detent opening R1B and hence can snap into place as well. In this way, the two locking pins 1A and 1B always are positively in engagement with both seat rails S1 and S2 without any clearance in an arrested position of the vehicle seat F. Every possible longitudinal seat position of the vehicle seat F thus is covered by at least one locking pin 1A or 1B each, and a clearance-free locking is secured by the respective second locking pin 1B or 1A snapping into place as well.

When both locking pins 1A and 1B are properly in engagement and displaced into their locking position, the securing section 41 of the unlocking element 4 also is positively positioned in the form-fit openings 110A and 110B of the locking pins 1A and 1B. When unlocking of the locking device V now is to be effected in order to permit an adjustment of the longitudinal seat position of the vehicle seat F, the unlocking element 4 is actuated, in the present case pressed in an opening direction OR-towards the locking pins 1A and 1B.

Figure 8A:
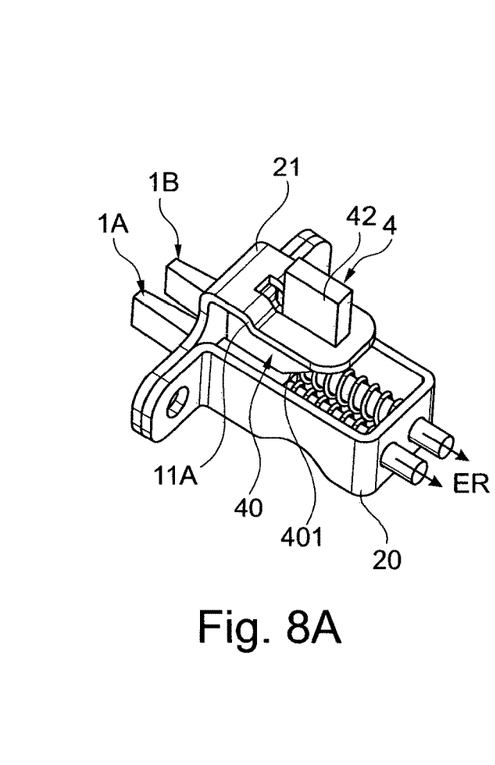
FIGS. 8A-8C in views corresponding with FIGS. 4A to 4C show the locking device at the beginning of unlocking by actuation of an unlocking element of the locking device.
Figure 8B:
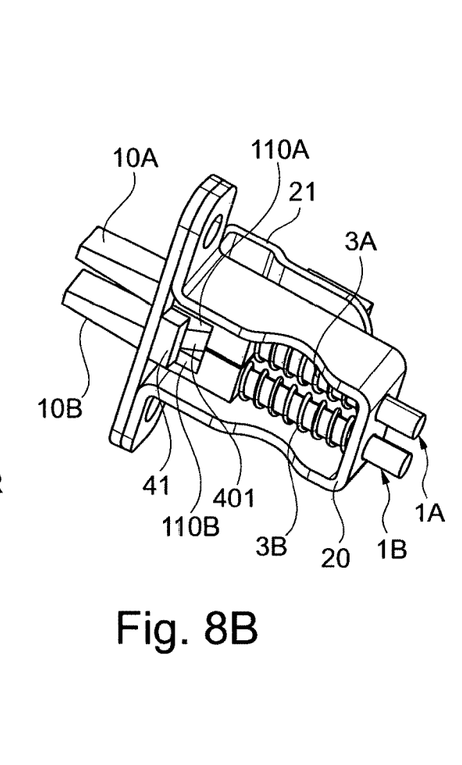
Figure 8C:
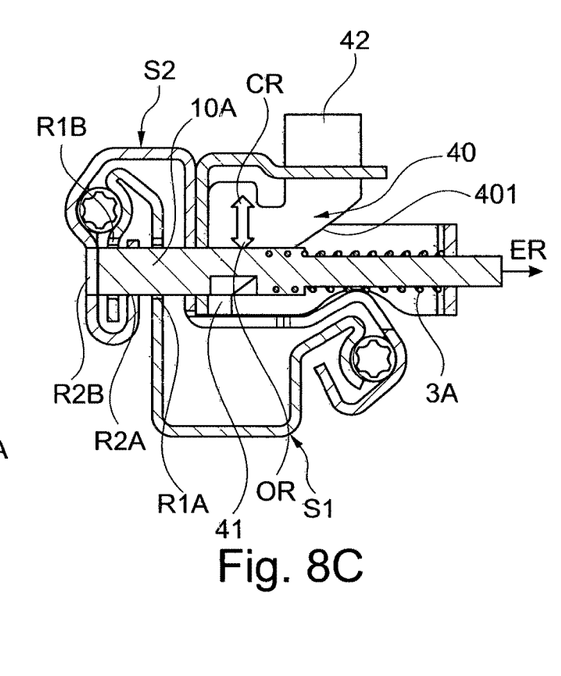

On actuation of the unlocking element 4 at the actuating section 42 projecting from an upper side of the locking pins 1A and 1B, corresponding to FIGS. 8A to 8C, the securing section 41 cuboid in the present case and transversely broadened with respect to the adjusting body 40 of the unlocking element 4 initially is displaced out of the form-fit openings 110A and 110B. Furthermore, the active surface 40 of the adjusting body 4, which extends in the form of a ramp at an angle to the opening direction OR, slides up on one control edge each of the locking pins 1A and 1B, which is provided at the edge of a through opening of the pair of locking pins 1A and 1B, via which the unlocking element 4 extends through the locking pins 1A and 1B. In contact with these control edges formed on the adjusting sections 11A and 11B and with counter-surfaces of the adjusting sections 11A, 11B possibly adjoining thereto and extending at an angle, the unlocking element 4—after a defined idle stroke—is synchronously pressed in an unlocking direction ER perpendicular to the opening direction OR and hence out of engagement with the detent openings R1A, R1B, R2A and R2B in the case of a further displacement in the opening direction OR.

Figure 9A:
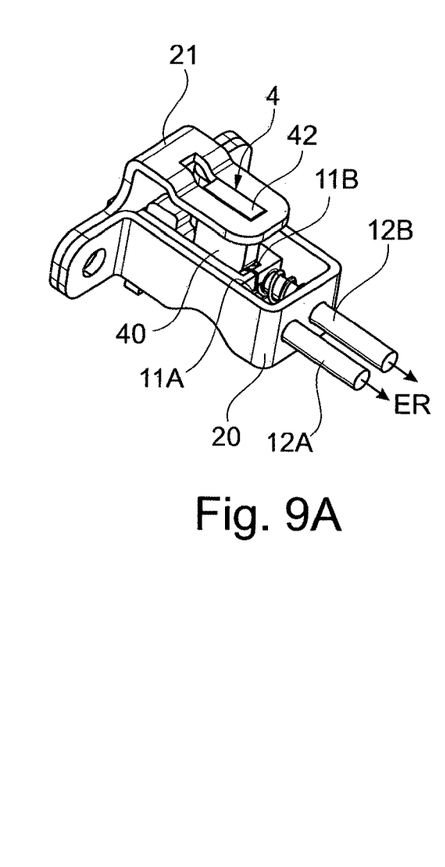
FIGS. 9A-9C in views corresponding with FIGS. 4A to 4C show the locking device in an unlocked state in which the two locking elements no longer engage in detent openings of the first and second rail element, which are provided for locking.
Figure 9B:
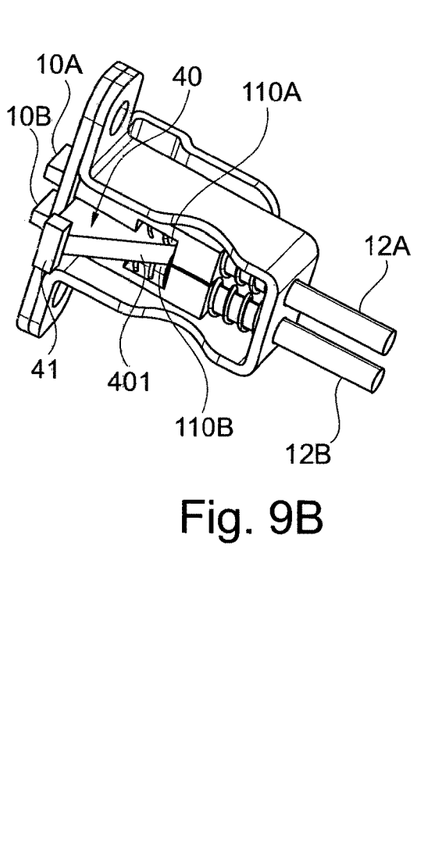
Figure 9C:
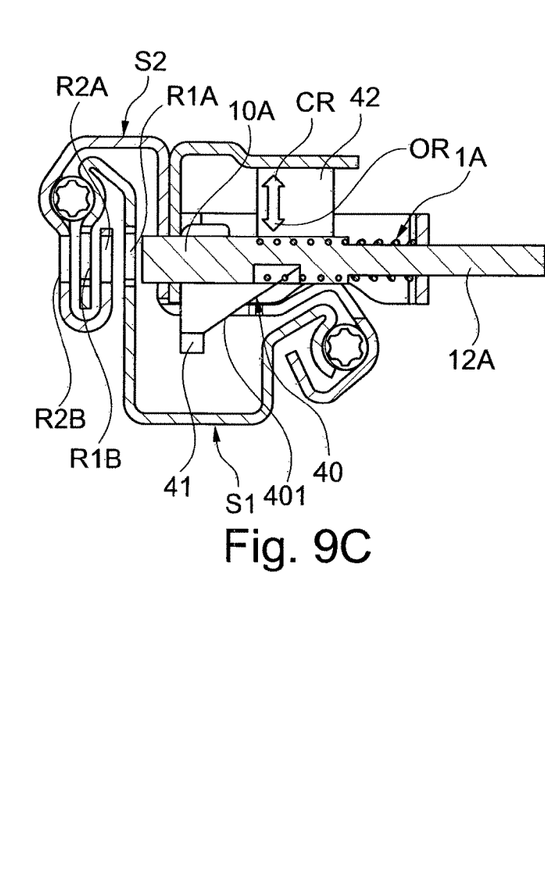

When the unlocking element 4, corresponding to FIGS. 9A to 9C, has been pressed in the opening direction OR (downwards) to such an extent that the insertion sections 10A and 10B no longer engage in the detent openings R1A, R1B, R2A and R2B of the two seat rails S1 and S2 facing each other in pairs, the vehicle seat F can be set in its longitudinal seat position. When the unlocking element 4 then no longer is held in an opening position by an adjusting force applied from outside and hence the locking pins 1A and 1B no longer are held in the unlocking position shown in FIGS. 9A to 9C, the locking pins 1A and 1B with their insertion sections 10A and 10B automatically snap into the detent openings R1A, R1B, R2A and R2B under the pretension of the compression springs 3A and 3B, as soon as a desired longitudinal seat position is taken.

Under the pretension of the compression springs 3A and 3B, which pretension the locking pins 1A and 1B into their locking positions, the unlocking element 4 also is pressed in a closing direction CR (upwards) opposite to the opening direction OR. Then, each locking pin 1A, 1B acts on the adjusting body 40 of the unlocking element 4 via its respective adjusting section 11A, 11B on the active surface 401 and, upon displacement in the direction of its locking position, presses the unlocking element 4 in the closing direction CR perpendicularly to the locking direction VR. The displaceability of the unlocking element 4 in the closing direction CR is limited by the securing section 41 abutting in the form-fit openings 110A and 110B. In the securing position of the unlocking element 4 defined thereby, the securing section 41 again is positively connected with the locking pins 1A and 1B, and in their locking positions taken the locking pins 1A, 1B are secured against a return into the unlocking positions.

Although the illustrated locking device V is provided for an arrestment of the vehicle seat F in a longitudinal seat position, the same in other design variants can be provided for example for an arrestment of a seat component of the vehicle seat F, e.g. for an arrestment of a seat underpart arranged on the seat base G, of a pan part arranged on the seat base G, or of a backrest part adjustable in its inclination relative to the seat base G. Via the engagement of the locking pins 1A, 1B in at least one corresponding detent opening it then is possible for example
  to arrest a rotatably or shiftably mounted seat underpart, e.g. of a swivel seat, or
  to arrest a pan inclination, backrest inclination or backrest head inclination.

| List of reference numerals | |
|---|---|
| 1A, 1B | locking pin (locking element) |
| 10A, 10B | insertion section |
| 110A, 110B | form-fit opening |
| 111.1A, 111.2A, 111.1B, 111.2B | abutment surface |
| 11A, 11B | adjusting section |
| 12A, 12B | shank section |
| 2 | housing |
| 20 | bearing part |
| 21 | guide part |
| 210 | guiding slot |
| 3A, 3B | compression spring (spring element) |
| 4 | unlocking element |
| 40 | adjusting body |
| 401 | active surface |
| 41 | securing section |
| 42 | actuating section |
| A1.1, A1.2, A2.1, A2.2, A2.3 | rail section |
| B | fastening section |
| b | opening width |

-continued

| List of reference numerals | |
|---|---|
| CR | closing direction |
| d1 | pin distance |
| d2 | pin pair width |
| ER | unlocking direction |
| F | vehicle seat |
| G | seat base |
| LR | longitudinal direction |
| OR | opening direction |
| R1A, R1B | 1st detent opening |
| R2A, R2B | 2nd detent opening |
| s | web width |
| S1, S2 | seat rail (rail element) |
| ST | latching web |
| V | locking device |
| VR | locking direction |

The invention claimed is:

1. A locking device for use in a vehicle seat the locking device comprising:
a locking element including an insertion section and configured to be adjusted along a locking direction into a locking position, in which the insertion section extends in to at least one detent opening; and
an unlocking element configured to be adjusted in an opening direction to adjust the locking element, in a direction opposite the locking direction to an unlocking position, in which the locking element is retracted from the at least one detent opening to permit an adjustment,
wherein the unlocking element includes at least one securing section, and
wherein, when the locking element is adjusted to the locking position, the at least one securing section of the unlocking element is received within a form-fit opening of the locking element, such that the securing section of the unlocking element abuts the locking element and blocks displacement of the locking element from the locking position to the unlocking position.

2. The locking device of claim 1, wherein via the securing section positively engaging the form-fit opening of the locking element, displacement of the locking element in a direction opposite to the locking direction is limited.

3. The locking device of claim 2, wherein when the locking element is in the locking position, the securing section extends into the form-fit opening with a clearance.

4. The locking device of claim 1, wherein when the locking element is located in the locking position, the securing section is configured to be displaced out of the form-fit opening via an adjustment of the unlocking element in the opening direction and the locking element is configured to be adjusted into the unlocking position.

5. The locking device of claim 1, wherein the unlocking element includes an active surface, the active surface is inclined with respect to the opening direction of the unlocking element, wherein in response to the active surface contacting the locking element and during an adjustment of the unlocking element in the opening direction, the locking element is configured to be adjusted in a direction opposite to the locking direction.

6. The locking device of claim 1, further comprising:
at least one spring element, wherein the locking element is elastically pretensioned into the locking position by the at least one spring element, and wherein via a contact of the locking element with the unlocking element, the at least one spring element pretensions the unlocking element in a closing direction extending oppositely to the opening direction.

7. The locking device of claim 1, wherein the unlocking element is configured to be pressed in the opening direction.

8. The locking device of claim 1, wherein the locking direction of the locking element extends perpendicularly to the opening direction of the unlocking element.

9. The locking device of claim 1, wherein the locking device includes at least two locking elements including the locking element, the at least two locking elements each configured to be disposed a locking position so that each of the at least two locking elements jointly extend into at least one detent opening or each of the at least two locking elements separately extend into the at least one detent opening.

10. The locking device of claim 9, wherein the at least two locking elements are spaced apart from each other, and the at least one detent opening includes a plurality of detent openings arranged one behind the other, wherein the plurality of detent openings of the at least one detent opening are dimensioned and spaced apart from each other to define different adjustment positions, including a first adjustment position, in which the at least two locking elements are configured to jointly extend into one detent opening of the plurality of detent openings of the at least one detent opening, and a second adjustment position, in which the at least two locking elements individually extend into two adjacent detent openings of the plurality of detent openings of the at least one detent opening that are separated from each other by a latching web, so that the latching web is disposed between each locking element of the at least two locking elements.

11. The locking device of claim 9, wherein when the at least two locking elements are located in the locking position, the at least one securing section of the unlocking element is configured to positively engage the form-fit openings of the at least two locking elements to block a displacement of the at least two locking elements to the unlocking position of the at least two locking elements.

12. The locking device of claim 9, wherein when the at least two locking elements are disposed in the locking position, the securing section is configured to be displaced out of the form-fit openings via an adjustment of the unlocking element in the opening direction.

13. A locking device for use in a vehicle seat, the locking device comprising:
at least two locking elements each including an insertion section and each configured to be adjusted along a locking direction into a locking position, in which each insertion section of each locking element of the at least two locking elements extends into at least one detent opening,
wherein the at least two locking elements are configured to be adjusted in a direction opposite to the locking direction of each locking element of the at least two locking elements into an unlocking position in which the respective locking element does not extend into the at least one detent opening; and
wherein at least one securing section of an unlocking device is configured to positively engages in a form-fit area disposed on each locking element of the at least two locking elements and block a displacement of each locking element of the at least two locking elements into respective unlocking positions.

14. A locking assembly for use in a vehicle seat including a first rail element and a second rail element configured to be adjusted along the first rail element to set a longitudinal position of the vehicle seat, the locking assembly comprising:
- a locking element including an insertion section and defining a form-fit area, wherein the locking element is configured to move in a locking direction into a locking position, in which the insertion section extends into at least one detent opening defined by the first rail element;
- an unlocking element configured to move in an opening direction to move the locking element in a direction opposite the locking direction to an unlocking position, in which the insertion section of the locking element does not extend into the at least one detent opening, wherein the unlocking element includes at least one securing section, and, when the locking element is adjusted to the locking position, the at least one securing section of the locking element engages the form fit area of the locking element, such that the securing section of the unlocking element abuts the locking element and blocks displacement of the locking element from the locking position to the unlocking position.

15. The locking assembly of claim 14, wherein at least one of the first rail element and the second rail element have a longitudinal extension, and the locking direction is perpendicular to the longitudinal extension.

16. The locking assembly of claim 14, wherein at least one of the first rail element and the second rail element have a longitudinal extension, wherein the at least one detent opening includes a first detent opening and a second detent opening, wherein the second rail element includes a first section, defining the first detent opening, and a second section defining the second detent opening, and wherein at least one of the first and second sections extends in a direction transverse to the longitudinal extension.

17. The locking assembly of claim 16, wherein the at least one detent opening includes a third detent opening and a fourth detent opening, wherein the first rail element includes a third section, defining the third detent opening, and a fourth section defining fourth detent opening, and wherein at least one of the third and fourth sections extends in a direction transverse to the longitudinal extension.

18. The locking assembly of claim 14, further comprising:
- a spring configured to bias the locking element towards the locking position.

19. The locking assembly of claim 14, wherein the unlocking element includes an active surface, the active surface is inclined with respect to the opening direction of the unlocking element, wherein in response to unlocking element moving in the opening direction, the active surface engages and moves the locking element to the unlocked position.

20. The locking assembly of claim 19, wherein the opening direction of the unlocking element is substantially orthogonal to the locking direction of the locking element.

\* \* \* \* \*